(12) United States Patent
Burgess et al.

(10) Patent No.: US 10,495,270 B2
(45) Date of Patent: Dec. 3, 2019

(54) LIGHT PROTECTION DEVICE FOR MIXING MULTIPLE LIGHT SOURCES

(71) Applicant: The Boeing Company, Chicago, IL (US)

(72) Inventors: Michael J. Burgess, Seattle, WA (US); William H. Valentine, Jr., Mill Creek, WA (US); Jing Ma, Mill Creek, WA (US); Paul J. Wilcynski, Seattle, WA (US)

(73) Assignee: The Boeing Company, Chicago, IL (US)

( * ) Notice: Subject to any disclaimer, the term of this patent is extended or adjusted under 35 U.S.C. 154(b) by 91 days.

(21) Appl. No.: 15/783,215

(22) Filed: Oct. 13, 2017

(65) Prior Publication Data

US 2019/0113184 A1 Apr. 18, 2019

(51) Int. Cl.
| | |
|---|---|
| *F21K 9/62* | (2016.01) |
| *F21V 11/08* | (2006.01) |
| *F21V 3/04* | (2018.01) |
| *F21K 9/66* | (2016.01) |
| *F21S 10/00* | (2006.01) |
| *G02B 5/02* | (2006.01) |
| *G02B 27/10* | (2006.01) |
| *G02B 27/18* | (2006.01) |

(Continued)

(52) U.S. Cl.
CPC .................. *F21K 9/62* (2016.08); *F21K 9/66* (2016.08); *F21S 10/00* (2013.01); *F21V 3/049* (2013.01); *F21V 11/08* (2013.01); *G02B 5/0278* (2013.01); *G02B 19/0028* (2013.01); *G02B 19/0066* (2013.01); *G02B 27/1006* (2013.01); *G02B 27/18* (2013.01); *F21K 9/69* (2016.08); *F21V 5/048* (2013.01); *F21Y 2115/10* (2016.08)

(58) Field of Classification Search
CPC ..... F21K 9/62; F21K 9/66; F21K 9/69; F21V 3/049; F21V 11/08; F21V 5/048; F21Y 2115/10
See application file for complete search history.

(56) References Cited

U.S. PATENT DOCUMENTS 9,091,416 B1* 7/2015 Olsson ................ F21V 19/0055
2008/0049315 A1* 2/2008 Morikuni ............... G03B 21/62
359/457

(Continued)

FOREIGN PATENT DOCUMENTS

EP 2177816 A2 4/2010

OTHER PUBLICATIONS

Search Report for related European Application No. EP18194690.6; report dated Mar. 22, 2019.

*Primary Examiner* — Mary Ellen Bowman
(74) *Attorney, Agent, or Firm* — Miller, Matthias & Hull LLP

(57) ABSTRACT

A light projection device includes a mixing tube having an open exit end, and a plurality of light sources, each of the plurality of light sources positioned to emit a light stream toward the open exit end of the mixing tube. A diffuser is disposed between the plurality of light sources and the open exit end of the mixing tube, the diffuser configured to diffuse at least one light stream from the plurality of light sources into a diffused light stream. A template is positioned proximate the open exit end of the mixing tube and configured to shape the diffused light stream from the diffuser into a patterned light stream.

20 Claims, 7 Drawing Sheets

(51) Int. Cl.
  *G02B 19/00*     (2006.01)
  *F21K 9/69*      (2016.01)
  *F21Y 115/10*    (2016.01)
  *F21V 5/04*      (2006.01)

(56) References Cited

U.S. PATENT DOCUMENTS

| | | | |
|---|---|---|---|
| 2011/0235337 A1* | 9/2011 | Jacksen | F21V 3/04 |
| | | | 362/308 |
| 2012/0155102 A1* | 6/2012 | Melzner | F21V 5/002 |
| | | | 362/510 |
| 2016/0069540 A1* | 3/2016 | Kjeldsen | F21S 10/00 |
| | | | 362/232 |
| 2017/0097130 A1* | 4/2017 | Nichols | F21S 10/007 |
| 2017/0146214 A1* | 5/2017 | Purchase | B29D 11/0074 |
| 2017/0205051 A1 | 7/2017 | Jorgensen | |

* cited by examiner

LIGHT PROTECTION DEVICE FOR MIXING MULTIPLE LIGHT SOURCES

TECHNICAL FIELD

The present disclosure relates generally to light projection systems and methods and, more particularly, to systems and methods of projecting patterned light.

BACKGROUND

Certain light projection systems, known as "gobos," use templates to block out portions of light generated by a light source, thereby to project desired patterns of light corresponding to cut-out portions of the template. In some applications, it may be desirable to use the same system to project light in different colors. For example, some conventional systems provide a light source that emits a single initial color of light, and one or more filters are provided to convert the initial light color to one or more different output light colors. These systems are incapable of transitioning between colors, or would otherwise require a large, mechanical filtering wheel to change the output light color. Conventional systems that use multiple light sources have an added problem of generating multiple light projections that are slightly offset when reaching the projection surface. For example, the projected light pattern 20 of a conventional, multi-light source device illustrated in FIG. 1 includes color shadows 22, 24 surrounding a central image 26, which makes the projected light pattern 20 fuzzy and multi-colored.

SUMMARY

In accordance with one example, a light projection device includes a mixing tube having an open exit end, and a plurality of light sources, each of the plurality of light sources positioned to emit a light stream toward the open exit end of the mixing tube. A diffuser is disposed between the plurality of light sources and the open exit end of the mixing tube, the diffuser configured to diffuse at least one light stream from the plurality of light sources into a diffused light stream. A template is positioned proximate the open exit end of the mixing tube and configured to shape the diffused light stream from the diffuser into a patterned light stream.

In accordance with another example, a gobo light projection device includes a mixing tube having an open exit end, and a plurality of light sources, each of the plurality of light sources positioned to emit a light stream toward the open exit end of the mixing tube. A prism is disposed between the plurality of light sources and the open exit end of the mixing tube, the prism including an entrance surface, facing the plurality of light sources, configured to diffuse at least one light stream from the plurality of light sources into a diffused light stream, and an exit surface, facing the open exit end of the mixing tube. A template is positioned proximate the open exit end of the mixing tube and configured to shape the diffused light stream from the diffuser into a patterned light stream.

In accordance with yet another example, a method for mixing light in a light projection device includes directing at least one light stream from a plurality of light stream sources toward an open exit end of a mixing tube, diffusing the at least one light stream to form a diffused light stream, and shaping the diffused light stream to form a patterned light stream.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Light projection devices and methods are described herein that produce a projected image having sharp pattern having a homogenous color from multiple light streams. The devices and methods diffuse and mix the light streams within a mixing tube. A template provided at an outlet end of the mixing tube selectively blocks the mixed light streams to create the desired pattern, which may then be focused on a projection surface.

Figure 1:
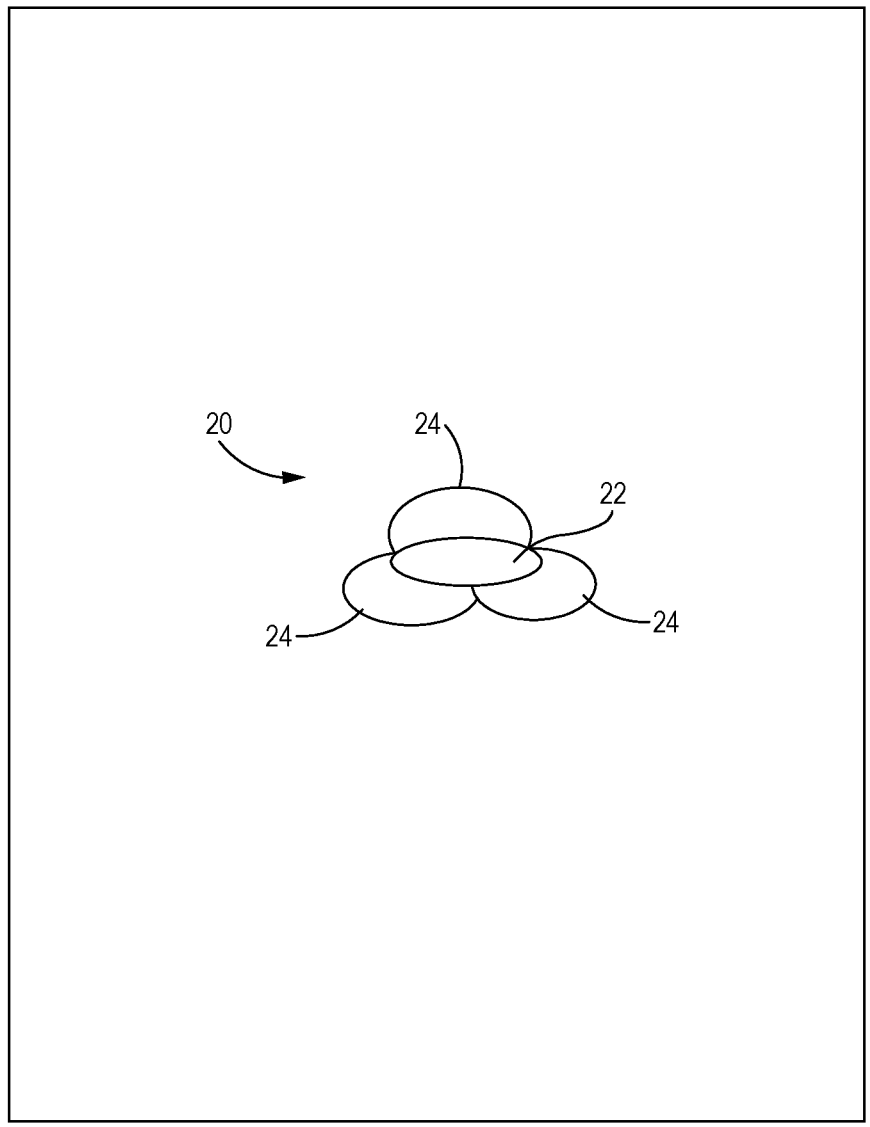
FIG. 1 is a diagrammatic depiction of a projected light pattern from a prior art light projection system showing displaced shadows and color fringes.
Figure 2:
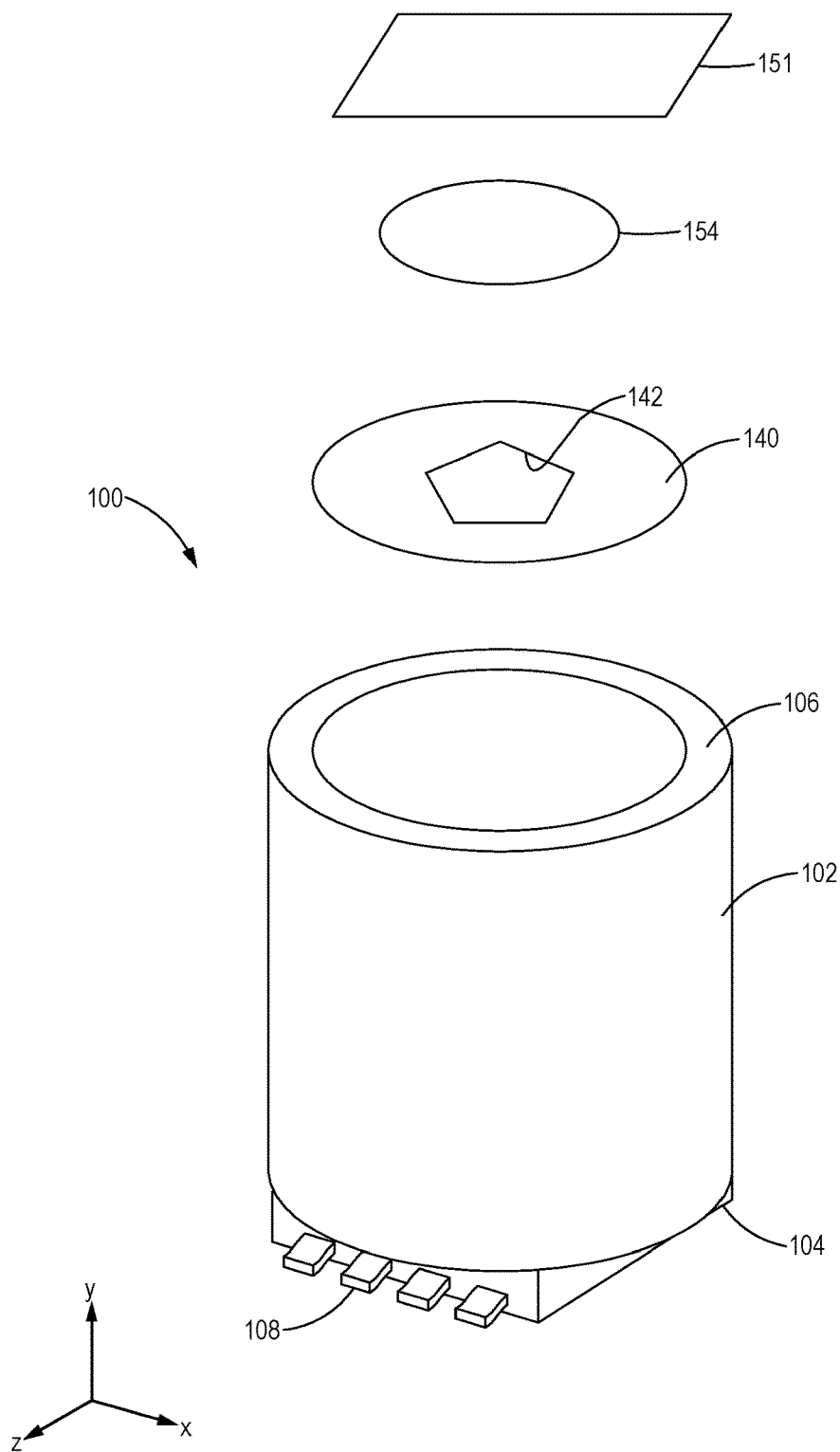
FIG. 2 is a perspective view of a light projection device, according to the present disclosure.

FIG. 2 illustrates a light projection device 100 according to the present disclosure. The light projection device 100 includes a mixing tube 102 having a base end 104 and an exit end 106. A base 108 encloses the base end 104 of the mixing tube 102, while the exit end 106 is open.

Figure 3:
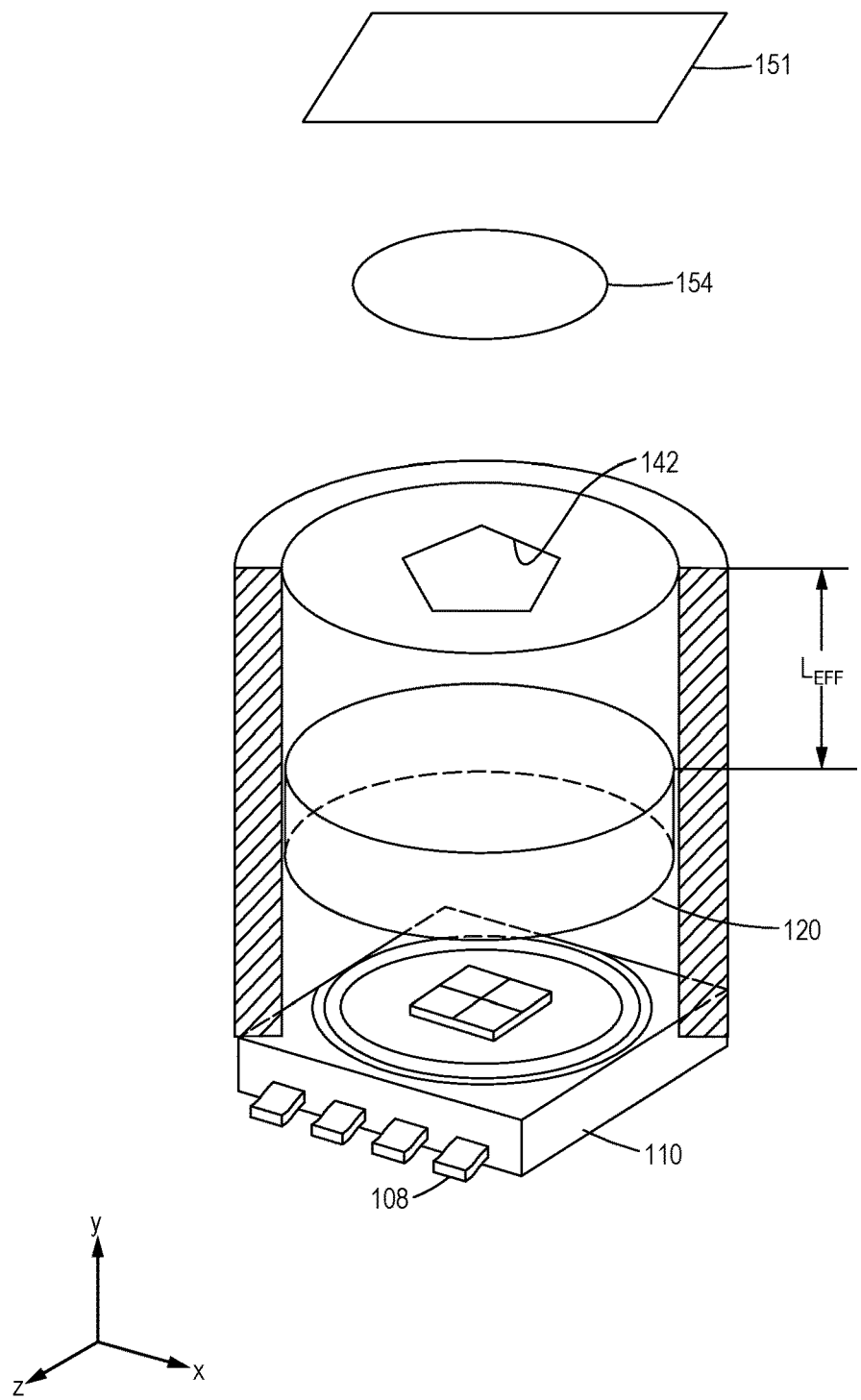
FIG. 3 is a perspective view, in partial cross-section, of the light projection device of FIG. 2.

A plurality of light sources 110 are disposed near the base end 104 of the mixing tube 102, with each light source 110 positioned to emit a light stream 112 toward the open exit end 106 of the mixing tube 102. As best shown with reference to FIGS. 3 and 4, the plurality of light sources 110 is coupled to the base 108. In exemplary embodiments, each of the plurality of light sources 110 may be provided as an independent light-emitting diode (LED). In other embodiments, the plurality of light sources 110 includes an integrated LED module having four LED lights.

Figure 4:
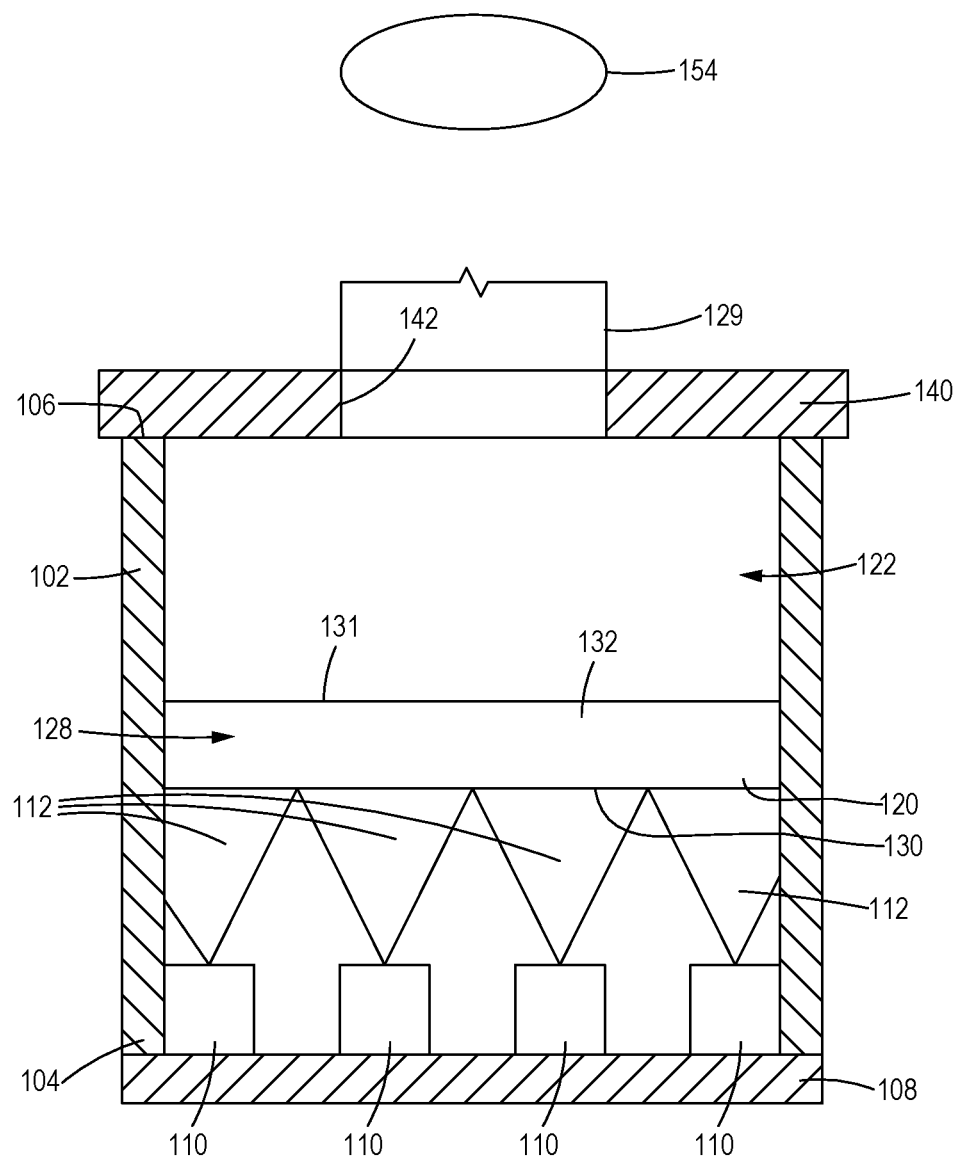
FIG. 4 is a schematic side elevation view, in cross-section, of the light projection device of FIG. 2.

As best shown in FIG. 4, a diffuser 120 is disposed between the plurality of light sources 110 and the open exit end 106 of the mixing tube 102, thereby to diffuse the light streams 112 from the plurality of light sources 110 into a diffused light stream 122. More specifically, the diffuser 120 is configured to deflect and/or refract the light streams 112. In the embodiment illustrated in FIG. 4, the diffuser 120 includes an entrance surface 130, an exit surface 131, and a body portion 132 extending between the entrance surface 130 and the exit surface 131.

Figure 5:
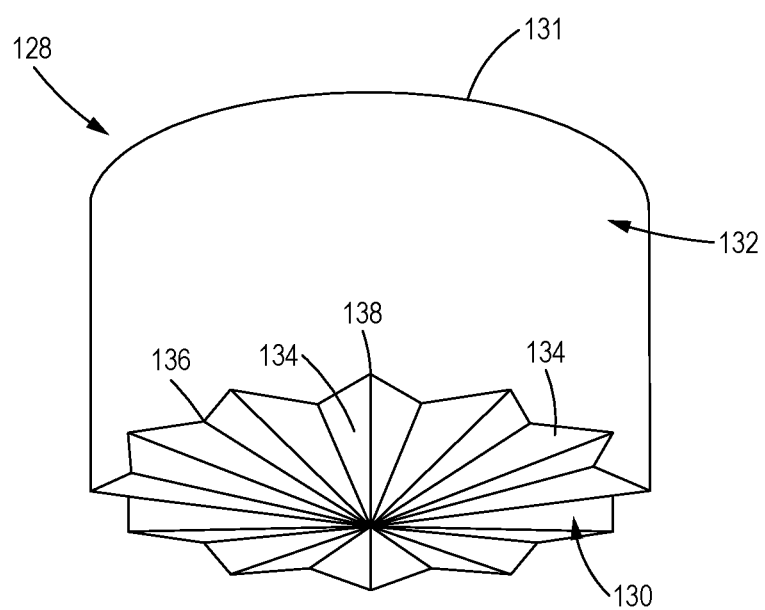
FIG. 5 is a perspective view of one embodiment of a diffuser for use in the light projection device of FIG. 4.
Figure 6:
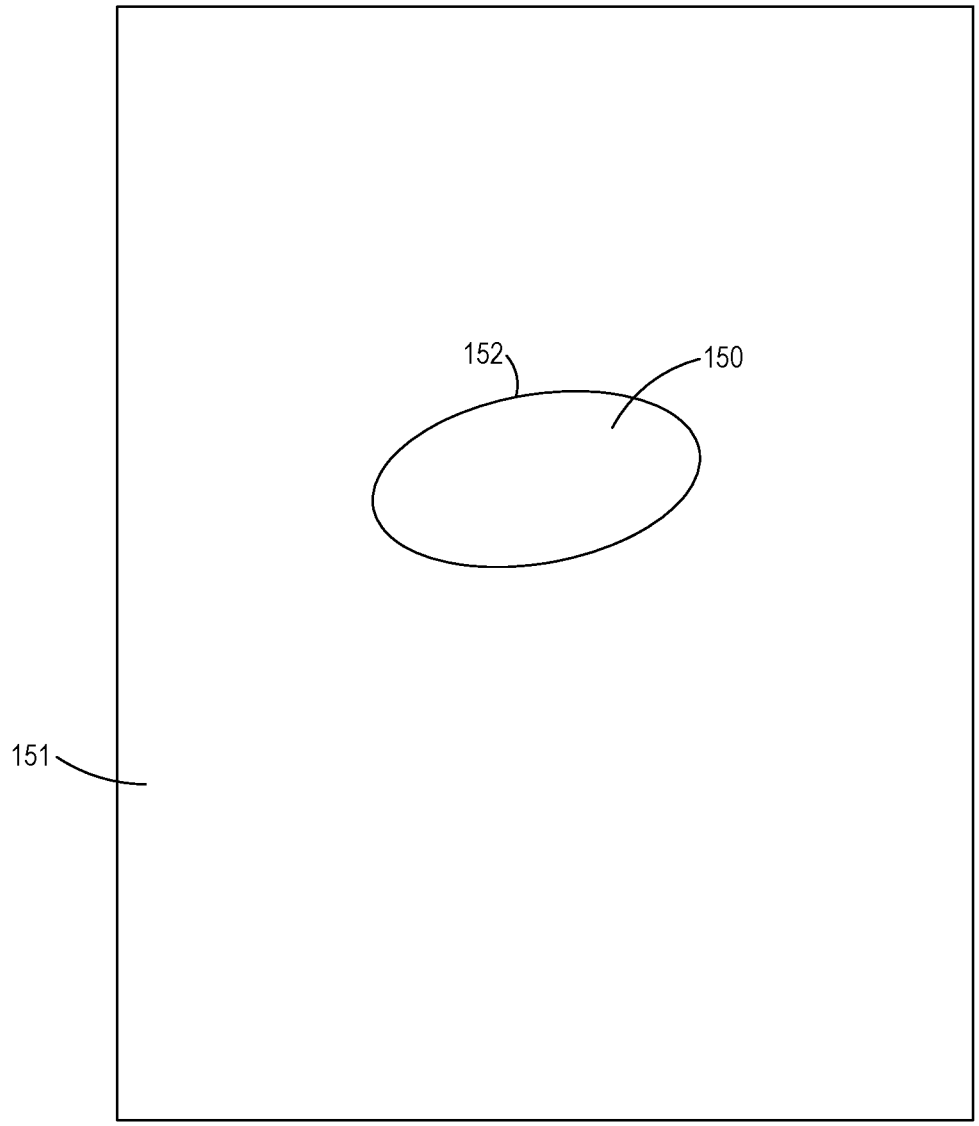
FIG. 6 is a diagrammatic depiction of a projected light pattern from the light projection devices according to the present disclosure.
Figure 7:
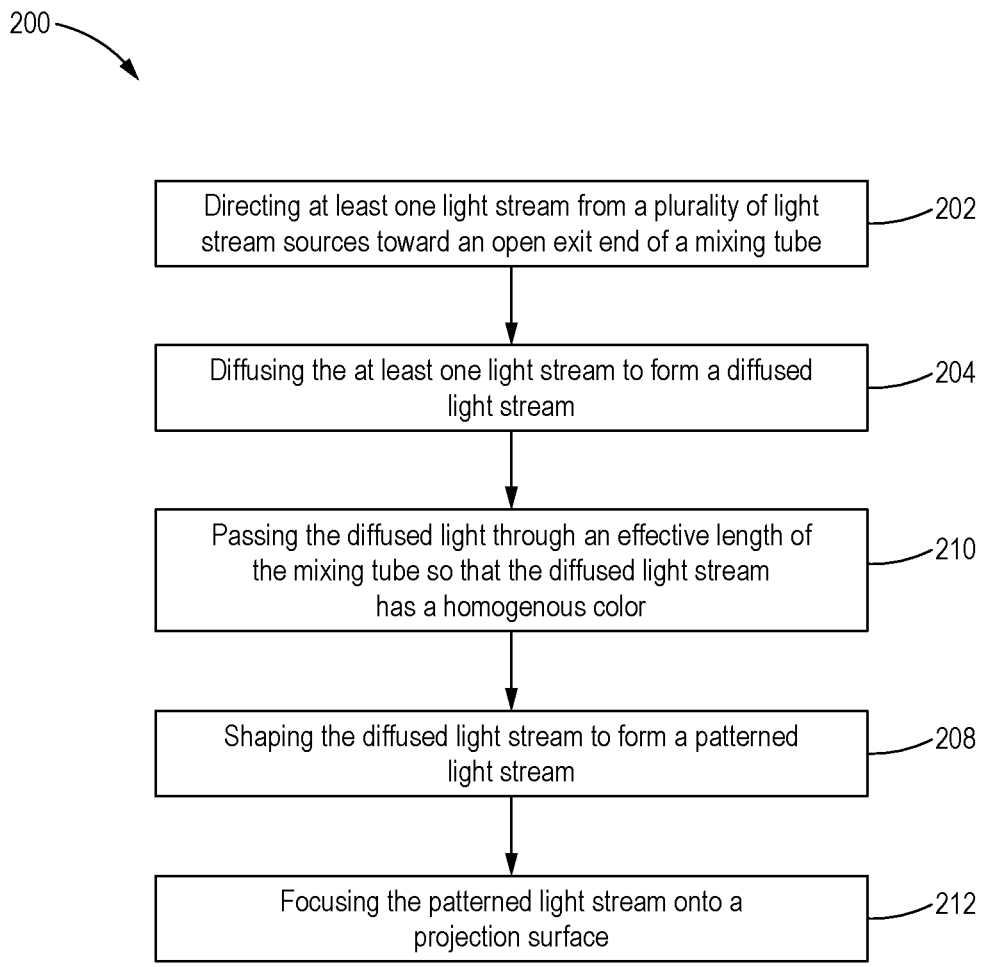
FIG. 7 is a schematic block diagram of a method of mixing light in a light projection device to create a patterned light stream having a homogenous color.

In an exemplary embodiment, the diffuser 120 is provided as a prism 128, as best shown in FIG. 5. The entrance surface 130 of the prism 128, is non-smooth to diffuse the light streams 112. In the illustrated embodiment, the entrance surface 130 includes a plurality of triangular facets 134, with ridges 136 and recesses 138 formed between adjacent facets 134. The pattern of ridges 136 shown in FIG. 6 is identified herein as a "rosette" pattern. The highest output area of each light source 110 is generally normal to the base 108, referred to herein as the on-axis direction. The facets 134 redirect the light from the on-axis direction to multiple off-axis directions, so that the highest light is now off-angle. That is, each facet 134 of the prism 128 displays a virtual image of an adjacent (or off-axis) light source 110, so that the multiple, facets 134 create multiple virtual light sources. An increased number of virtual light sources makes the resulting diffused light stream 122 appear more homogenous.

A template 140 is positioned proximate the open exit end 106 of the mixing tube 102 to selectively block the diffused light stream 122 from the diffuser 120 into a patterned light stream 129. More specifically, the template 140 may be provided as a generally opaque barrier having one or more openings 142 formed therein, with the openings 142 corresponding to the desired shape of the patterned light stream 129. In some embodiments, the template 140 may be provided as a device commonly referred to as a "gobo."

The mixing tube 102 may have an effective length $L_{EFF}$, which is described herein as the length of a portion of the mixing tube 102 extending between the diffuser 120 and the template 140, that is sufficient to mix the diffused light stream 122 into a homogenous color. That is, when the light sources 110 generate light streams 112 having different colors, the diffused light stream 122 has a single, homogenous color. Accordingly, the patterned light stream 129 may be provided in a wide spectrum of colors by varying the intensity of each differently colored light stream 112. The mixing tube 102 may have an internal surface that is highly reflective to project light more efficiently.

As best shown in FIG. 6, the resulting patterned light stream 129 produces an image 150 on a projection surface 151 having sharp edges 152 and a homogenous color. In some embodiments, an imaging optic 154 may be positioned downstream of the template 140. The imaging optic 154 may be configured to focus the patterned light stream 129 onto the projection surface 151. Accordingly, the imaging optic 154 may be provided as one or more convex lenses, a multi-element optical system (such as a camera or projector lens), or other optical device.

In view of the foregoing, a method 200 for mixing light in a light projection device 100 to create a patterned light stream 129 having a homogenous color may be performed, as schematically illustrated by the flow diagram of FIG. 8. The steps of the method may be performed in other sequences than the particular sequence shown, and the particular sequence shown by the flowchart is representative.

The method 200 begins at block 202, wherein at least one light stream 112 from a plurality of light stream sources is directed toward an open exit end 106 of a mixing tube 102. As noted above, the plurality of light sources 110 may include different colored LEDs provided either independently or integrally in a module.

At block 204, at least one of the light streams 112 is diffused to form a diffused light stream 122. Diffusing the at least one light stream 112 may include passing the light stream 112 through a diffuser 120 configured to diffuse the at least one light stream 112 into the diffused light stream 122. The diffuser 120 may be provided as prism 128.

At block 208, the diffused light stream 122 is shaped to form a patterned light stream 129. Shaping the diffused light stream 122 into the patterned light stream 129 may include passing the diffused light stream 122 through a template 140 having openings 142 corresponding to the desired shape of the patterned light stream 129.

In some embodiments, the method 200 may further include block 210, in which the diffused light is passed through an effective length $L_{EFF}$ of the mixing tube 102 so that the diffused light stream 122 has a homogenous color.

In yet other embodiments, the method 200 may also include block 212, in which the patterned light stream 129 is focused onto a projection surface 151, such as by passing the patterned light stream 129 through an imaging optic 154.

In view of the foregoing, the light projection devices and methods described herein use multiple light streams to produce a projected image having a sharp pattern and a homogenous color. The devices and methods diffuse and mix the light streams within a mixing tube. A template provided at an outlet end of the mixing tube selectively blocks the diffused light stream to form a desired pattern of light on a projection surface.

What is claimed is:

1. A light projection device comprising:
   a mixing tube having an open exit end;
   a plurality of light sources, each of the plurality of light sources positioned to emit a light stream toward the open exit end of the mixing tube;
   a diffuser disposed between the plurality of light sources and the open exit end of the mixing tube, the diffuser configured to diffuse at least one light stream from the plurality of light sources into a diffused light stream, the diffuser including an entrance surface, facing the plurality of light sources, that is non-smooth; and
   a template positioned proximate the open exit end of the mixing tube and configured to shape the diffused light stream from the diffuser into a patterned light stream.

2. The light projection device of claim 1, in which the diffuser comprises a prism.

3. The light projection device of claim 1, in which the entrance surface comprises ridges.

4. The light projection device of claim 1, in which each of the plurality of light sources comprises a light-emitting diode (LED).

5. The light projection device of claim 1, in which the plurality of light sources includes an LED module having four LED lights.

6. The light projection device of claim 1, in which the template comprises a gobo.

7. The light projection device of claim 1, further comprising an imaging optic positioned downstream of the template and configured to focus the patterned light stream.

8. The light projection device of claim 7, in which the imaging optic comprises a lens.

9. A gobo light projection device comprising:
   a mixing tube having an open exit end;
   a plurality of light sources, each of the plurality of light sources positioned to emit a light stream toward the open exit end of the mixing tube;

a prism disposed between the plurality of light sources and the open exit end of the mixing tube, the prism including:

an entrance surface facing the plurality of light sources and configured to diffuse at least one light stream from the plurality of light sources into a diffused light stream, the entrance surface being non-smooth; and an exit surface, facing the open exit end of the mixing tube; and a template positioned proximate the open exit end of the mixing tube and configured to shape the diffused light stream from the diffuser into a patterned light stream.

10. The gobo light projection device of claim 9, in which the entrance surface of the prism comprises ridges.

11. The gobo light projection device of claim 10, in which the ridges are formed in a rosette pattern.

12. The gobo light projection device of claim 9, in which each of the plurality of light sources comprises a light-emitting diode (LED).

13. The gobo light projection device of claim 9, in which the plurality of light sources includes an LED module having four LED lights.

14. A method for mixing light in a light projection device, the method comprising:

directing at least one light stream from a plurality of light stream sources toward an open exit end of a mixing tube;

passing the at least one light stream through a diffuser to form a diffused light stream, wherein the diffuser includes an entrance surface, facing the plurality of lights sources, that is non-smooth; and shaping the diffused light stream to form a patterned light stream.

15. The method of claim 14, in which the diffuser comprises a prism.

16. The method of claim 14, further comprising focusing the patterned light stream onto a projection surface.

17. The method of claim 14, in which the plurality of light sources includes an LED module having four LED lights.

18. The light projection device of claim 1, in which the ridges are formed in a rosette pattern.

19. The light projection device of claim 18, in which the mixing tube extends along an axis, and in which the entrance surface comprises a plurality of facets oriented to redirect the at least one light stream toward an off-axis direction.

20. The gobo light projection device of claim 10, in which the mixing tube extends along an axis, and in which the entrance surface comprises a plurality of facets oriented to redirect the at least one light stream toward an off-axis direction.

* * * * *